United States Patent
Mackiw et al.

[15] 3,637,371
[45] Jan. 25, 1972

[54] DIRECT PRESSURE LEACHING OF COPPER-IRON SULPHIDES

[72] Inventors: Vladimir Nicolaus Mackiw, Fort Saskatchewan, Alberta; Herbert Veltman, Edmonton, Alberta; Andrew Imre Vizsolyi, Vancouver, British Columbia, all of Canada

[73] Assignee: Sherritt Gordon Mines Limited, Toronto, Ontario, Canada

[22] Filed: June 19, 1967

[21] Appl. No.: 647,201

[30] Foreign Application Priority Data

Feb. 10, 1967 Canada.....................982,536

[52] U.S. Cl....................75/101, 23/125, 75/115, 75/117
[51] Int. Cl..........................................C22b 15/08
[58] Field of Search............75/101, 117, 1; 23/125

[56] References Cited

UNITED STATES PATENTS

| | | | |
|---|---|---|---|
| 3,034,864 | 5/1962 | Nashner | 23/224 |
| 981,451 | 1/1911 | McKechnie et al. | 75/101 |
| 2,746,859 | 5/1956 | McGauley et al. | 75/1 X |
| 3,174,849 | 3/1965 | Mackiw et al. | 75/101 X |
| 3,241,950 | 3/1966 | Mackiw et al. | 75/101 X |
| 3,282,682 | 11/1966 | Harlan | 75/117 |

Primary Examiner—Oscar R. Vertiz
Assistant Examiner—G. O. Peters
Attorney—Frank I. Piper

[57] ABSTRACT

Complex copper-iron bearing sulphides, particularly chalcopyrite, ground to at least 90 percent minus 325 mesh standard Tyler screen are leached in aqueous sulphuric acid solution containing less acid than that required to combine with the copper content of the sulphides as copper sulphate. Leaching is continued at a temperature within the range of 210° F. to 250° F. under an oxygen partial pressure above 100 p.s.i. until all the acid is consumed and the iron content of the solution is lowered to an acceptable level.

9 Claims, No Drawings

DIRECT PRESSURE LEACHING OF COPPER-IRON SULPHIDES

BACKGROUND OF THE INVENTION

This invention relates to the hydrometallurgical treatment of complex copper and iron bearing sulphides and, more particularly to a process for the extraction of copper values and the production of elemental sulphur from such sulphides by direct oxidizing pressure leaching in aqueous acid media.

Copper is often present in ores and concentrates in the form of complex mineral sulphides containing copper, iron and sulphur combined in varying proportions, for example, as in chalcopyrite ($CuFeS_2$) and bornite ($Cu_3FeS_3$). One hydrometallurgical approach used to extract copper and other nonferrous metal values from such minerals involves leaching them under oxidizing conditions at elevated temperatures, below the melting point of sulphur, in an aqueous acid solution containing at least one mole of acid per mole of metal to be leached. Copper and other soluble sulphate-forming, nonferrous metals are dissolved in the leach solution and sulphide sulphur in the sulphides is oxidized to elemental form. The dissolved metals may be recovered from the leach solution and the elemental sulphur from the residue by methods known in the art. A particularly desirable feature of this process is that sulphur is recovered in elemental form and it can therefore be economically stored and/or shipped to the expanding sulphur markets.

However, the known low-temperature acid oxidation leaching processes for complex copper-iron sulphides suffer from several disadvantages which adversely affect their capital and operating economics. Such processes generally require prolonged leaching periods to produce acceptable copper extractions. For example, to extract about 85 percent of the copper from a typical chalcopyrite concentrate by leaching in a sulphuric acid solution at about 246° F. and under about 50 p.s.i. oxygen pressure, about 12 hours is required. Such extended retention times naturally reflect unfavorably on the overall economics of this method as a means for recovering copper and sulphur from complex copper-iron sulphides. Another disadvantage of these processes, particularly when applied to chalcopyrite, is that regardless of leaching conditions or retention times, total copper recovery is generally less than 85 percent. There is, therefore, substantial room for improvement in the degree of extraction as well as the rate of extraction in these processes.

Another problem is the removal of iron contamination from the leach solution. It is necessary, in order to facilitate subsequent processing of the leach solution for the recovery of copper, that the solution contain a minimum amount, preferably less than 5 g.p.l., of dissolved iron. However, during leaching, a substantial quantity of the iron present in the sulphides reacts with available acid and goes into solution as ferrous sulphate. This iron can be effectively removed from solution by hydrolysis but the ferrous sulphate must first be oxidized to the 3-valent form and the oxidation of ferrous iron to ferric iron proceeds very slowly under the conditions of the leaching step. The result is that retention time must be further prolonged in order to effect iron removal by hydrolysis or the iron content of the leach solution is undesirably high for subsequent processing. Also, available acid is tied up by the iron in solution thereby adversely affecting the efficiency of the copper leaching and sulphur oxidation reactions.

SUMMARY OF THE INVENTION

The principal object of the present invention, therefore, is to provide a process for the direct aqueous acid oxidation leaching of complex copper and iron containing sulphides whereby copper values are rapidly and efficiently extracted with maximum conversion of the sulphide sulphur content of the sulphides to elemental sulphur.

A further object is to provide such a process wherein rapid and effective removal of iron contamination from the leach solution is achieved such that a minimum overall retention time is required to produce a leach solution containing a suitable concentration of dissolved copper and a sufficiently low level of iron contamination to permit subsequent treatment of the solution for the recovery of pure copper metal by conventional electrolytic or direct reduction methods.

The process by which these and other objects and advantages of the invention are achieved is based on the discovery that the leaching rate of complex copper-iron sulphides, and particularly chalcopyrite, in aqueous sulphuric acid media in the presence of free oxygen and the rate of iron removal from the leach solution can be very substantially increased by conducting the leaching operation with a solution containing less than 1 mole of acid per mole of copper in the sulphides and controlling the process parameters of feed material particle size, leaching temperature and oxygen partial pressure within certain critical limits.

More specifically, in the leaching operation, the relative amounts of sulphuric acid and sulphides are adjusted and correlated such that there is sufficient acid available for reaction with copper values in the sulphides to produce the desired copper sulphate concentration in the leach solution and such that there is less than 1 mole of acid available for reaction with each mole of copper in the sulphides being leached. The feed material must have a particle size of at least 90 percent minus 325 mesh standard Tyler screen, the temperature is maintained between about 210° F. and 250° F., and the oxygen partial pressure is maintained above 100 p.s.i.g.

DESCRIPTION OF THE PREFERRED EMBODIMENTS

In a preferred embodiment of the process, the starting material is at least 99.5 percent minus 325 mesh standard Tyler screen, sufficient acid is provided to combine with 60–80 grams per liter (g.p.l.) of copper as copper sulphate, the acid-to-copper molar ratio in the leach slurry is maintained within the range of 0.80:1 to 0.66:1, the leaching temperature is maintained within the range of 230° F. to 245° F. and the oxygen partial pressure is maintained within the range of about 200 p.s.i.g. to about 500 p.s.i.g.

The elemental sulphur in the leach residue may be recovered by separating it, together with the unleached sulphides, from the remainder of the leach residue, such as by froth flotation, and then separating the elemental sulphur fraction from the sulphides fraction such as by hot filtration, distillation or solvent extraction. The recovered sulphides are then preferably reground and recycled to the leaching operation.

We have found that in the practice of this process in the treatment of a typical chalcopyrite flotation concentrate, for example, a solution containing 60–80 grams per liter (g.p.l.) of copper can be obtained in 2½ to 6 hours. Within the same time period, the iron concentration in the leach solution is reduced to about 5 g.p.l. or less. Copper recoveries in the overall process are in excess of 97 percent with conversion of about 85 percent or more of the sulphide sulphur to elemental form.

These results represent a remarkable improvement in extractive efficiency and retention time for leaching and iron removal compared with the prior art methods for acid oxidation leaching such materials.

The process of this invention is applicable to either high or low grade material containing complex copper-iron sulphides. However, the starting material normally will be a high-grade copper and iron containing sulphide concentrate obtained by selective froth flotation of copper-bearing sulphide ores. Such concentrates will often contain other nonferrous metals in addition to copper. For example, a typical chalcopyrite concentrate may include some zinc, nickel and/or cobalt and cadmium. It is to be understood, therefore, that the use of the terms "complex sulphides" or "sulphides" herein is intended to include such material and it is also intended to include any other high or low grade materials which contain iron and economically recoverable quantities of copper in complex sulphide form.

In carrying out the present invention, the first step involves pulverization of the sulphide starting material such as by wet grinding. The particle size of the sulphides has a very pronounced effect on the reaction rate in the subsequent acid oxidation leaching step. It is essential in order to realize the benefits of the invention that the starting material be ground to at least 90 percent minus 325 mesh standard Tyler screen. It is generally desirable to grind the sulphides as fine as it is economically feasible. That is, for any particular sulphide material and treating facility, the optimum degree of grinding is determined by balancing the cost of effecting increasingly finer particle size against the economic benefit of the reduced retention time resulting therefrom. In most cases, in order to realize the full advantages of the invention, it is preferable to grind the sulphides to at least 99.5 percent minus 325 mesh standard Tyler screen.

After pulverization, the sulphides are slurried with a dilute aqueous sulphuric acid solution. Preferably, this is done on a continuous basis in a separate slurry makeup step in which the sulphides are dispersed in the acid solution at atmospheric temperature and pressure. The relative quantities of sulphides and acid are adjusted as described in detail hereinbelow and the adjusted slurry is fed continuously into a pressure vessel such as a multicompartment, horizontal autoclave in which the leaching reaction is conducted. The process can also be conducted batchwise with the slurry makeup and leaching operations both being carried out in the leaching vessel, but the operating economics of the continuous process are generally more favorable.

In the leaching step, the slurry is reacted at elevated temperature and pressure with an oxidizing gas to effect extraction of copper and iron from the sulphides with concurrent oxidation of sulphide sulphur to elemental form. According to the invention, the acid-copper molar ratio in the slurry and the temperature and the partial pressure of oxidizing gas in the leaching step are controlled within certain critical limits to substantially increase the rate of the leaching and iron removal reactions and to obtain high copper extractions and maximum conversion of sulphide sulphur to elemental sulphur.

The quantity of acid that must be provided for the leaching reaction depends on the amount of copper desired in the final leach solution. Sufficient acid must be available in the leaching step to combine with copper values contained in the sulphides as sulphates to produce the desired concentration of dissolved copper in the solution. It is generally desirable to produce a leach solution containing 60–80 grams per liter copper since normally the copper will be recovered from the leach solution by electrolysis or direct pressure reduction, and about 60–80 grams per liter is the preferred range of copper concentration for these operations. Once the desired copper concentration is established, the amount of acid required to produce this concentration can be readily calculated having regard to the residual acid and copper contents, if any, of the leach solution, and the stoichiometric requirements of the amount of copper that must be extracted from the sulphides to yield the desired copper concentration.

In most cases, the leaching plant will be associated with a copper recovery facility and all or a part of the leach solution will be made up from recycled liquor from the copper-winning operation. This liquor will normally contain regenerated sulphuric acid equivalent to the amount of dissolved copper which is recovered in elemental form. Accordingly, except for initial makeup acid, total acid requirements for the leaching operation when it is conducted on a continuous basis in conjunction with electrolytic or direct reduction copper recovery, are limited to the amount needed to compensate for mechanical losses and losses to any acid-reactive diluent materials in the sulphides, such as lead, which form insoluble sulphates.

The acid-copper molar ratio in the leach slurry must be adjusted such that there is less than 1 mole but more than 0.55 mole of acid for each mole of copper in the slurry. That is, there must be an excess of sulphides in the leach slurry over the amount required to provide copper values for combining stoichiometrically with the available acid in the slurry to produce copper sulphate. Generally, the $H_2SO_4/Cu$ molar ratio should be controlled in the range of 0.80:1 (the equivalent of 25 w/o of excess sulphides) to 0.55:1 (the equivalent of an 80 w/o excess) and preferably about 0.66:1 (the equivalent of 50 w/o excess sulphides).

The pulp density of the leach slurry, i.e., the quantity of sulphides provided in the leaching step, is determined having regard to the copper content of the sulphides, the desired copper concentration of the final leach solution and the necessity for maintaining an excess of sulphides over the amount required to satisfy the stoichiometric requirements of the available acid. In general, it is desirable to operate at a pulp density within the range of about 20 to 50 percent. The reaction rate is reduced as pulp density is increased beyond the level where optimum dispersion of the solids and oxygen in the solution can be maintained and, of course, the overall efficiency of the process is reduced if the pulp density is too low.

The leaching reaction is conducted at a temperature above about 210° F. but below 250° F. The leaching reaction is exothermic, so normally only a small amount of extraneous heat is required to initiate the reaction. The preferred operating temperature of the leaching reaction is from about 230° F. to about 245° F. The upper temperature limit, 250° F., is critical to the operability of the process. At temperatures above 250° F. the leaching reaction terminates when only a portion of the available acid is consumed and, although the leaching rate is rapid to the point of termination, very poor copper extractions are obtained regardless of retention time.

The total pressure at which the leaching reaction is conducted is the pressure autogenously generated at the temperature of the reaction plus the overpressure of oxidizing gas. Preferably, the oxidizing gas is air but pure oxygen or oxygen-enriched air may also be used. It is essential that the oxidizing gas be fed into the reaction vessel at a rate and pressure sufficient to maintain the oxygen partial pressure in the reaction vessel above about 100 p.s.i.g. The rates of the leaching reaction and the iron oxidation and hydrolysis reactions increase with increasing oxygen partial pressure. It is found that increments of improvement in reaction rates are most pronounced as oxygen partial pressure is increased from 100 to 200 p.s.i.g. Between 200 and 500 p.s.i.g., reaction rates increase marginally with increasing oxygen partial pressure. Above 500 p.s.i.g., negligible increases in reaction rates are obtained with increasing oxygen partial pressure. The preferred oxygen range of partial pressure for the process is about 200 p.s.i.g.

The leaching reaction is conducted until substantially all available acid has been consumed and, if necessary, heating with agitation and under oxygen partial pressure is continued for a sufficient additional period of time to lower the dissolved iron content of the solution to an acceptable level (usually below about 5 g.p.l.) by oxidation and hydrolysis.

We have found that the rate of iron removal from the solution can be accelerated by the presence of up to 20 g.p.l. and preferably from about 5 to about 10 g.p.l. of ammonium sulphate in the solution. For example, in a typical case the iron content of a leach solution which contains no ammonium sulphate is lowered to below about 5 g.p.l. in about 3 hours. This time is reduced to about 2 hours by the addition of 5 g.p.l. of ammonium sulphate and to only 1½ hours by the addition of 10 g.p.l. Since the added ammonium sulphate is not consumed in the iron hydrolysis reaction, the ammonium sulphate content of the system can be readily controlled within the desired range by an initial addition followed by minor adjustments of the ammonium sulphate content of the recycle solution as required to compensate for mechanical losses.

When acid consumption and iron removal are substantially complete, the slurry is discharged, usually on a continuous basis at a rate sufficient to balance the rate of slurry feed to the reaction vessel and rapidly cooled to below the boiling point. The discharge slurry is comprised of a solids fraction and aqueous sulphate solution containing dissolved copper, a small amount of dissolved iron and, where present in the sulphides, small amounts of any other nonferrous metals such as zinc, cadmium and nickel, for example, which are taken into solution under the leaching conditions. Since the leaching operation is conducted with less acid than that required to leach all the sulphides in the leach slurry, the solids fraction contains unleached sulphides in addition to elemental sulphur and gangue material such as silica and oxidized substances produced in the leaching reaction such as ferric hydroxide and basic ferric sulphate.

The slurry discharged from the reaction vessel must be treated to separate leach solution from the solid leach residue and the latter may be treated to separate the oxidized fraction and gangue material from the elemental sulphur and unleached sulphides. Preferably, the unleached sulphides fraction is separated from the elemental sulphur, reground and recycled to the leaching step. The quantity of recycled sulphides will, of course, depend on the exact amount of excess sulphides provided in the leaching operation.

The details of the methods by which these various liquid-solids and solids-solids separations are carried out do not constitute any part of the present invention. One suitable procedure is as follows: The slurry discharged from the leach vessel is subjected to liquid-solids separation such as by thickening and filtration. The solution and wash water can be passed to a copper-winning operation where the solution is treated to remove nonferrous metal impurities, if necessary, and copper is recovered by electrolysis or direct reduction with a reducing gas such as hydrogen. The end liquor from the copper recovery operation, which will contain regenerated sulphuric acid equivalent in amount to the copper recovered as elemental copper, can be recycled to the leaching operation.

The wash leach residue from the liquid-solids separation steps is repulped in water to provide a slurry containing 200 to 400 grams per liter of solids. This slurry is then subjected to a conventional sulphide flotation operation to separate the elemental sulphur and unleached sulphides from the other solid residue. The tailings from the flotation step, which normally will contain ferric hydroxide, basic iron sulphate, gangue material and insoluble, nonferrous metal sulphates such as $PbSO_4$ can be discarded or treated to recover values such as lead and precious metals, if present.

The flotation concentrate which contains substantially all of the unleached sulphides and elemental sulphur is subjected to an elemental sulphur recovery step. There are a number of suitable methods which can be employed for this purpose. According to one procedure, elemental sulphur is separated from the sulphides by volatilization, the sulphur is condensed, hot filtered and recovered as a 99.9 percent pure byproduct. Alternatively solvent extraction of the elemental sulphur with a suitable solvent such as carbon disulphide or dimethyl disulphide may be employed. In either case, the sulphides, after separation of the elemental sulphur preferably are reground and returned to the slurry makeup or leaching steps.

In a modification of the foregoing procedure, the slurry discharged from the leaching autoclave is heated and agitated in a separate vessel at a temperature above the melting point of sulphur, e.g., about 280° F. for a short period of time, e.g., 20 minutes. The slurry is then flash-cooled with resultant formation of elemental sulphur pellets containing unreacted sulphides bound up by elemental sulphur. The pellets are screened off, the undersized material from the screening operation is subjected to froth flotation, the flotation concentrate is combined with the pellets and this combined product is then subjected to the elemental sulphur recovery procedure outlined above.

Another suitable procedure is to repulp the flotation concentrate containing elemental sulphur and sulphides in water. The resulting slurry is heated in a pressure vessel to a temperature of 280° F. to 300° F. and is then pressure filtered. This results in a filtrate containing pure elemental sulphur and water and a filter cake consisting essentially of sulphides.

The invention is further explained and illustrated by the following tests:

The material treated in the following tests was a chalcopyrite concentrate obtained by selective froth flotation of a nickel-copper bearing sulphide ore. The concentrate had the following composition: (wt./percent) Cu–31.5 percent, Fe–31.1, S–33.1, insol.–2.6, balance—incidental metal and nonmetal impurities. The screen analysis (standard Tyler screen) was as follows: +65 mesh—trace; −65+100—5.0 percent; −100+200—20.4 percent; −200+325—22.0 percent; −325—52.6 percent. All tests were carried out in a 3-gallon high-pressure autoclave with a titanium liner and agitator. The charge in each case was 6,000 ml. containing 95 g.p.l. $H_2SO_4$ which is the theoretical amount of acid required to bring about 60 g.p.l. copper into solution.

TEST 1

In this test, the charges contained 300 g.p.l. of concentrate (an acid to copper molar ratio of 0.66:1 or about 50 w/o of sulphides in excess of the amount required to provide copper values for combination with all the acid). The particle size of the starting material was varied for each run by wet grinding samples of the concentrate to increasing degrees of fineness. The temperature and oxygen partial pressure were kept at a constant 230° F. and 500 p.s.i.g. respectively for all runs. The results are shown in table I.

TABLE I

| Run No. | % solids minus 325 mesh standard Tyler screen | Cu in solution (g.p.l.) After | | Fe in solution (g.p.l.) After | |
|---|---|---|---|---|---|
| | | 3 Hrs. | 6 Hrs. | 3 Hrs. | 6 Hrs. |
| 1 | 52.6 | 25.0 | 41.5 | 21.5 | 9.5 |
| 2 | 65.8 | 25.5 | 42.0 | 23.0 | 12.5 |
| 3 | 79.6 | 28.5 | 46.5 | 25.0 | 10.0 |
| 4 | 89.7 | 37.5 | 57.0 | 23.0 | 4.5 |
| 5 | 99.5 | 61.5 * | 71.5 * | 3.0 | 0.8 |

* In these and other tests where more than the target concentration of copper (60 g.p.l.) was taken into solution, the acid requirements for the addition of copper was derived from oxidation of a part of the sulphide sulphur to sulphate.

Table I shows that the particle size of the concentrate is critical to the rates of copper extraction and iron removal. In runs 1, 2 and 3 where the material was less than 90 percent minus 325 mesh, even after 6 hours only 69–78 percent of the desired copper was extracted and iron concentration was at least double the acceptable maximum level of 5.0 g.p.l. With concentrate ground to 89.7 percent minus 325 mesh, 95 percent of the desired copper was extracted in 6 hours and iron concentration was reduced to 4.5 g.p.l. in the same time. With 99.5 percent minus 325 mesh concentrate, the desired results were achieved in 3 hours.

TEST 2

In this test, the procedure of test 1 was repeated except that the starting material for each run was ground to 99.5 percent minus 325 mesh standard Tyler screen, the temperature was kept constant at 230° F. and $O_2$ partial pressure was varied for each run. The results are shown in table II.

TABLE II

| Run | $O_2$ Partial pressure p.s.i.g. | Cu in Solution (g.p.l.) After | | Fe in Solution (g.p.l.) After | |
|---|---|---|---|---|---|
| | | 3 Hrs. | 6 Hrs. | 3 Hrs. | 6 Hrs. |
| 1 | 30 | 38.0 | 48.5 | 18.0 | 5.8 |
| 2 | 100 | 45.5 | 58.0 | 9.0 | 3.3 |
| 3 | 200 | 56.0 | 68.0 | 5.8 | 2.0 |
| 4 | 500 | 61.5 | 71.5 | 3.0 | 0.8 |

Table II shows that at an oxygen partial pressure of 30 p.s.i.g. after 3 hours only 38.0 grams per liter of copper have been brought into solution. This represents only about 63 percent of the desired copper concentration (60 g.p.l.). After an additional 3 hours (6 hours total) the copper concentration has been increased to only 48.5 g.p.l. (81 percent of the desired concentration). At 100 p.s.i.g. oxygen partial pressure 76 percent of the desired copper was in solution after 3 hours and about 97 percent after 6 hours. Further improvements in extraction rates were obtained as the oxygen partial pressure was increased above 100 p.s.i.g. and at 500 p.s.i.g. over 100 percent of the desired copper concentration was extracted in 3 hours. At the same time, total iron in solution was only 3.0 g.p.l.

TEST 3

In this test, the procedure of test 2 was repeated except that oxygen partial pressure was maintained at 500 p.s.i.g. for each run while the amount of excess sulphides (acid/copper ratio) was varied. The results are shown in table III.

TABLE III

| Run | % Excess Sulphides | $H_2SO_4/Cu$ Molar Ratio | Cu in Solution (g.p.l.) After 3 Hrs. | Cu in Solution (g.p.l.) After 6 Hrs. | Fe in Solution (g.p.l.) After 3 Hrs. |
|---|---|---|---|---|---|
| 1 | 0 | 1:1 | 42.0 | 53.0 | 7.0 |
| 2 | 25 | 0.8:1 | 62.0 | 70.0 | 6.0 |
| 3 | 50 | 0.66:1 | 61.5 | 72.0 | 3.0 |
| 4 | 100 | 0.5:1 | 66.0 | 75.0 | 2.0 |

Table III shows that in the absence of an excess of sulphides under optimum conditions of temperature and oxygen overpressure only 70 percent and 88.5 percent of the desired 60 g.p.l. for which acid is made available in the solution, was extracted after 3 and 6 hours respectively. Also, the amount of iron in solution after 3 hours was undesirably high. With a 50 percent or 100 percent excess of sulphides, the desired copper and iron concentrations were reached in the 3-hour period.

TEST 4

In this test, the same procedure was followed as in test 2 and test 3 except that oxygen partial pressure and acid-copper ratio were maintained at 500 p.s.i.g. and 0.66:1 respectively for each run while the temperature was varied. The results appear in table IV.

TABLE IV

| Run | Temperature °F. | Cu in Solution (g.p.l.) After 3 Hrs. | Cu in Solution (g.p.l.) After 6 Hrs. | Fe in Solution (g.p.l.) After 3 Hrs. | Fe in Solution (g.p.l.) After 6 Hrs. |
|---|---|---|---|---|---|
| 1 | 210 | 40.0 | 63.0 | 21.0 | 1.5 |
| 2 | 230 | 61.5 | 71.5 | 3.0 | 0.8 |
| 3 | 240 | 67.5 | 75.2 | 3.0 | 0.8 |
| 4 | 250 | 66.0 | 72.0 | 2.7 | 0.8 |
| 5 | 260 | 39.5 | 44.5 | 12.0 | 13.0 |
| 6 | 280 | 45.0 | 50.0 | 14.5 | 16.5 |

Table IV shows that at 210° F. the desired copper and iron concentrations were reached in 6 hours, while under optimum temperature conditions (230°–240° F.) only 3 hours are required. At temperatures above 250° F., the leaching reaction substantially ceased when about 66 percent of the desired copper concentration was obtained. Also, iron concentration remained undesirably high.

It will be understood, of course, that modifications can be made in the preferred embodiment of the present invention as described hereinabove without departing from the scope and purview of the appended claims.

What we claim as new and desire to protect by Letters Patent of the United States is:

1. A hydrometallurgical process for treating complex copper and iron containing mineral sulphides to extract copper values therefrom and produce elemental sulphur and an aqueous leach solution containing a predetermined concentration of dissolved copper and a minimum amount of dissolved iron which comprises the steps of dispersing the sulphides having a particle size of at least 90 percent minus 325 mesh standard Tyler screen in an aqueous sulphuric acid solution to form a slurry; adjusting the relative amounts of acid and sulphides in the slurry such that the amount of acid is sufficient to stoichiometrically combine with copper values contained in the sulphides as sulphate to produce said predetermined copper concentration in solution and such that the acid to copper molar ratio in the slurry is between about 0.8:1 and 0.55:1; reacting the slurry in a closed reaction vessel at a temperature within the range of 210° F. to 250° F. with a free oxygen bearing gas fed into the reaction vessel at a rate sufficient to maintain a partial pressure of oxygen above 100 p.s.i.g. to extract copper and iron values from the sulphides and dissolve them in the leach solution as soluble sulphates with concurrent conversion of sulphide sulphur associated with said copper and iron values to elemental form; continuing said reaction with agitation to effect consumption of substantially all the sulphuric acid available in the slurry and to oxidize, hydrolyze and precipitate dissolved iron values; and separating product leach solution containing dissolved copper values and minimal iron values from solid leach residue.

2. The process according to claim 1 including the steps of separating unleached sulphides and elemental sulphur from the leach residue, separating elemental sulphur from unleached sulphides and recycling the unleached sulphides to the slurry-forming step.

3. The process according to claim 2 wherein the leaching reaction is conducted at a temperature within the range of 230° F. to 245° F.

4. The process according to claim 2 wherein the oxygen partial pressure in the leaching reaction is about 200 p.s.i.g.

5. The process according to claim 2 wherein the dispersed sulphides have a particle size of less than 99.5 minus 325 mesh standard Tyler screen.

6. A hydrometallurgical process for treating complex copper and iron containing mineral sulphides to extract copper values therefrom and produce elemental sulphur and an aqueous leach solution containing a predetermined concentration of dissolved copper and a minimum amount of dissolved iron which comprises the steps of: dispersing the sulphides having a particle size of at least 90 percent minus 325 mesh standard Tyler screen in an aqueous sulphuric acid solution to form a slurry; adjusting the relative amounts of acid and sulphides in the slurry such that the amount of acid is sufficient to stoichiometrically combine with copper values contained in the sulphides as sulphate to produce said predetermined copper concentration in solution and such that the acid-to-copper molar ratio in the slurry is less than 1:1 but more than 0.55:1; reacting the slurry in a closed reaction vessel at a temperature within the range of 210° F. to 250° F. with a free oxygen bearing gas fed into the reaction vessel at a rate sufficient to maintain a partial pressure of oxygen above 100 p.s.i.g. to extract copper and iron values from the sulphides and dissolve them in the leach solution as soluble sulphates with concurrent conversion of sulphide sulphur associated with said copper and iron values to elemental form; continuing said reaction with agitation to effect consumption of substantially all of the sulphuric acid available in the slurry and to oxidize, hydrolyze and precipitate dissolved iron values from the leach solution, said solution having up to 20 grams per liter of ammonium sulphate provided therein prior to the iron precipitation step whereby the rate of iron precipitation from the solution is increased; and separating product leach solution containing dissolved copper values and minimal iron values from solid leach residue.

7. The process according to claim 6 wherein from about 5.0 to about 10.0 grams per liter of ammonium sulphate is provided.

8. The process according to claim 2, wherein the complex copper and iron containing mineral sulphides comprise chalcopyrite.

9. The process according to claim 2 wherein the complex copper and iron containing mineral sulphides comprise bornite.

* * * * *